(12) United States Patent
Shirk et al.

(10) Patent No.: US 6,357,792 B1
(45) Date of Patent: Mar. 19, 2002

(54) AIR BAG INFLATOR WITH BURST DISK

(75) Inventors: Bryan W. Shirk; Timothy A. Swann; Roy D. Van Wynsberghe, all of Mesa; John W. Nicklos, Chandler, all of AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/672,546

(22) Filed: Sep. 28, 2000

(51) Int. Cl.⁷ ............................................... B60R 21/26
(52) U.S. Cl. .................. 280/737; 137/68.13; 137/68.27
(58) Field of Search ................................. 280/737, 741, 280/742; 137/68.11, 68.19, 68.23, 68.24, 68.27, 68.13; 222/3

(56) References Cited

U.S. PATENT DOCUMENTS

| | | | |
|---|---|---|---|
| 4,301,938 A | * 11/1981 | Wood et al. | 220/89.3 |
| 4,512,491 A | * 4/1985 | DeGood et al. | 220/89.2 |
| 4,803,136 A | * 2/1989 | Bowsky et al. | 429/56 |
| 4,905,722 A | * 3/1990 | Rooker et al. | 137/68.1 |
| 5,002,085 A | * 3/1991 | FitzGerald | 137/68.1 |
| 5,377,716 A | * 1/1995 | Farwell et al. | 137/68.1 |
| 5,411,158 A | * 5/1995 | Kays et al. | |
| 5,558,114 A | * 9/1996 | Strelow | 137/68.27 |
| 6,062,599 A | * 5/2000 | Forbes et al. | 280/737 |
| 6,182,704 B1 | * 2/2001 | Bevacco | 138/89 |

* cited by examiner

Primary Examiner—Paul N. Dickson
Assistant Examiner—Faye M. Fleming
(74) Attorney, Agent, or Firm—Tarolli, Sundheim, Covell, Tummino & Szabo L.L.P.

(57) ABSTRACT

An apparatus (10) for inflating an inflatable vehicle occupant protection device (12) comprises a container (14) defining a chamber (16). The container (16) has an opening (24) through which fluid can flow from the chamber (16). A quantity of inflation fluid (20) is in the chamber (16). A burst disk (30) closes the opening. The burst disk (30) has first and second opposite major side surfaces (34, 36). The burst disk (30) has a first score line (40, 42) on the first major side surface (36) and a second score line (46, 48) on the second major side surface (34). The burst disk (30) is rupturable at the first and second score lines (40, 42, 46, 48) to permit inflation fluid (20) to flow out of the chamber (16) through the opening (24) in the container (14).

7 Claims, 5 Drawing Sheets

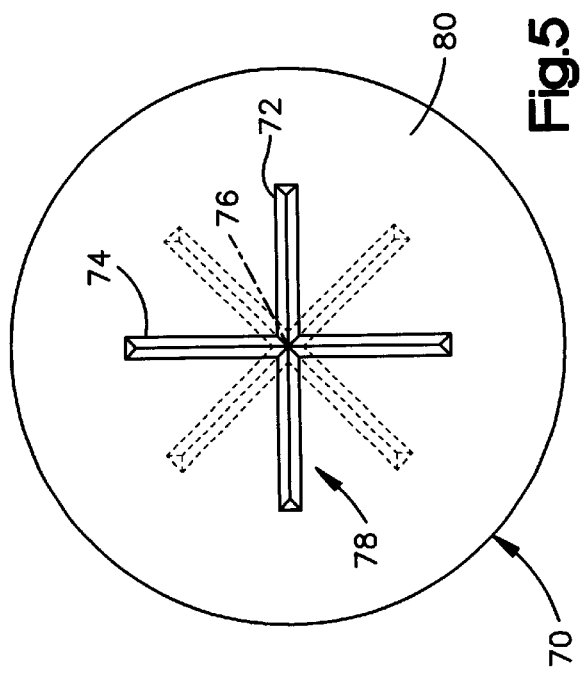
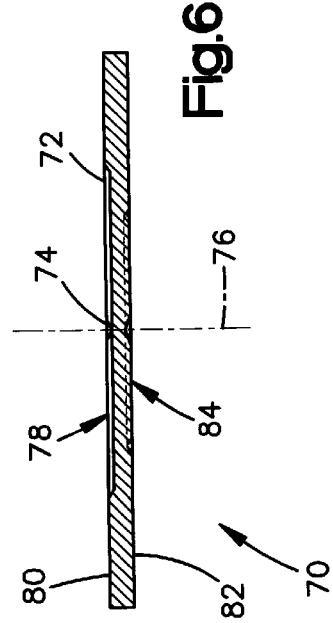
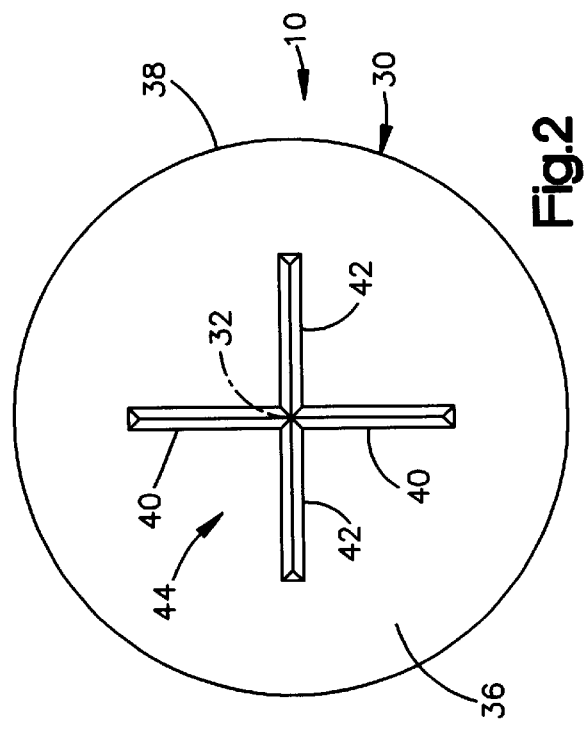
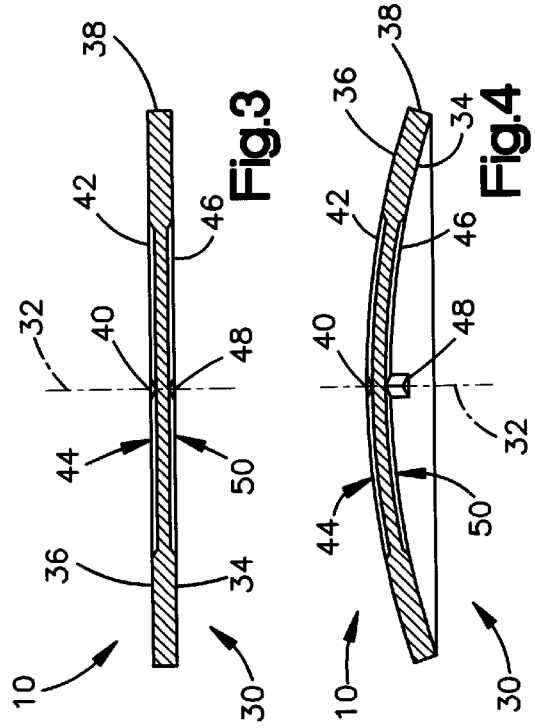

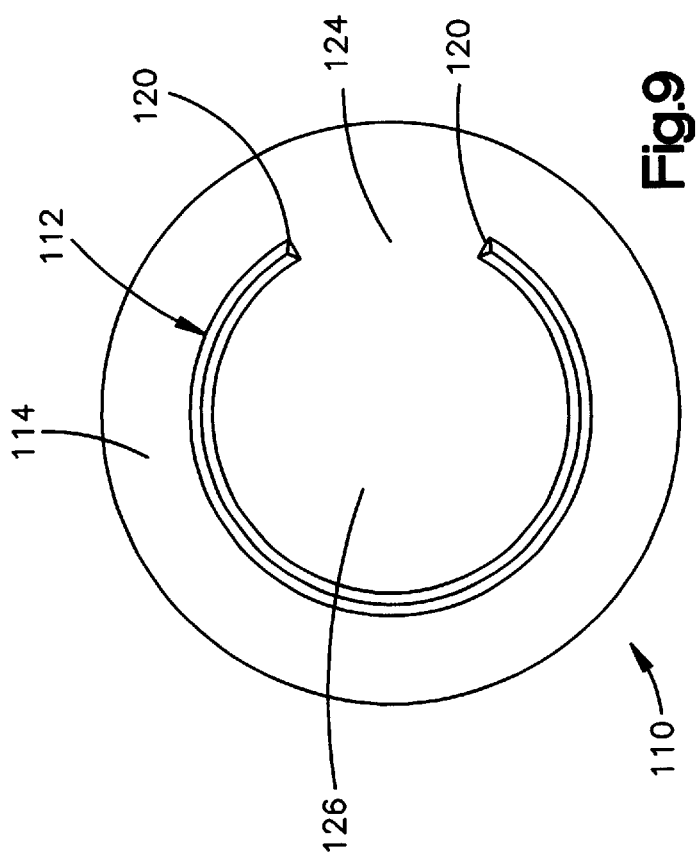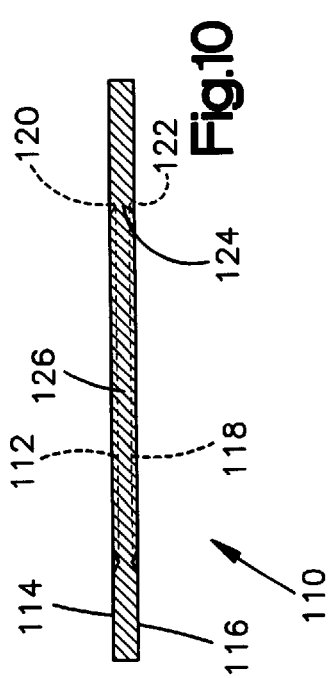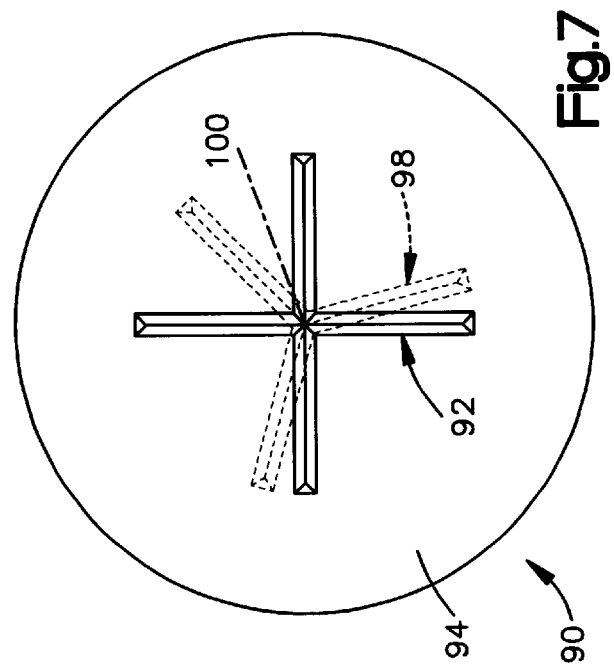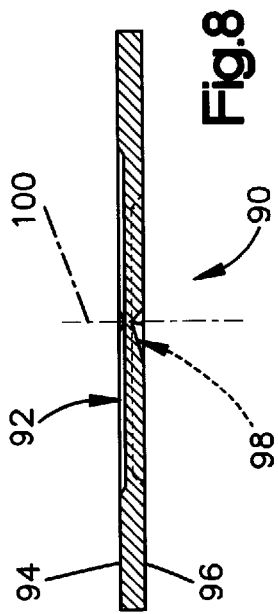

AIR BAG INFLATOR WITH BURST DISK

BACKGROUND OF THE INVENTION

1. Technical Field

The present invention relates to an apparatus for inflating an inflatable vehicle occupant protection device, such as an air bag. In particular, the present invention relates to an air bag inflator including a container having a rupturable portion, such as a burst disk.

2. Description of the Prior Art

A known type of inflator for inflating an air bag includes a container in which inflation fluid is stored under pressure. The container has a rupturable portion, such as a burst disk covering an opening in a wall portion of the container. The pressurized fluid in the container acts on an inner side surface of the burst disk. An opposite outer side surface of the burst disk is at ambient pressure. Upon actuation of the inflator, the burst disk is ruptured, by increased fluid pressure in the container, to release inflation fluid to flow into the air bag.

The burst disk typically includes one or more predetermined weakened portions, such as score lines formed on the burst disk, to facilitate controlled rupturing of the burst disk. The burst disk will rupture at a first pressure differential when it has score lines only on its inner side surface (exposed to pressurized fluid in the container). The burst disk will rupture at a second, different, pressure differential, when it has score lines only on its outer side surface. A burst disk with score lines on only one side must be oriented properly during assembly of the inflator, to ensure that it ruptures at a desired, predetermined container pressure. That is, the burst disk must be assembled in the inflator with one side, and not the other, exposed to the pressurized fluid in the container.

SUMMARY OF THE INVENTION

The present invention is an apparatus for inflating an inflatable vehicle occupant protection device. The apparatus comprises a container defining a chamber. The container has an opening through which fluid can flow from the chamber. A quantity of inflation fluid is in the chamber. A burst disk closes the opening. The burst disk has first and second opposite major side surfaces. The burst disk has a first score line on the first major side surface and a second score line on the second major side surface. The burst disk is rupturable at the first and second score lines to permit inflation fluid to flow out of the chamber through the opening in the container.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 2 is an enlarged plan view of the burst disk of the inflator of FIG. 1;

FIG. 3 is a sectional view of the burst disk of FIG. 2;

FIG. 4 is a view similar to FIG. 3 showing the burst disk in a condition after actuation of the inflator of FIG. 1 and prior to rupturing of the burst disk;

FIG. 5 is a plan view of a burst disk constructed in accordance with a second embodiment of the invention;

FIG. 6 is a sectional view of the burst disk of FIG. 5;

FIG. 7 is a plan view of a burst disk constructed in accordance with a third embodiment of the invention;

FIG. 8 is a sectional view of the burst disk of FIG. 7;

FIG. 9 is a plan view of a burst disk constructed in accordance with a fourth embodiment of the invention;

FIG. 10 is a sectional view of the burst disk of FIG. 9;

DETAILED DESCRIPTION OF EMBODIMENTS OF THE INVENTION

The present invention relates to an apparatus for inflating an inflatable vehicle occupant protection device, such as an air bag. Other inflatable vehicle occupant protection devices that can be used with an apparatus in accordance with the invention include, for example, inflatable seat belts, inflatable knee bolsters, inflatable head liners, inflatable side curtains, and knee bolsters operated by inflatable air bags. In particular, the present invention relates to an air bag inflator having a rupturable portion, such as a burst disk.

Figure 1:
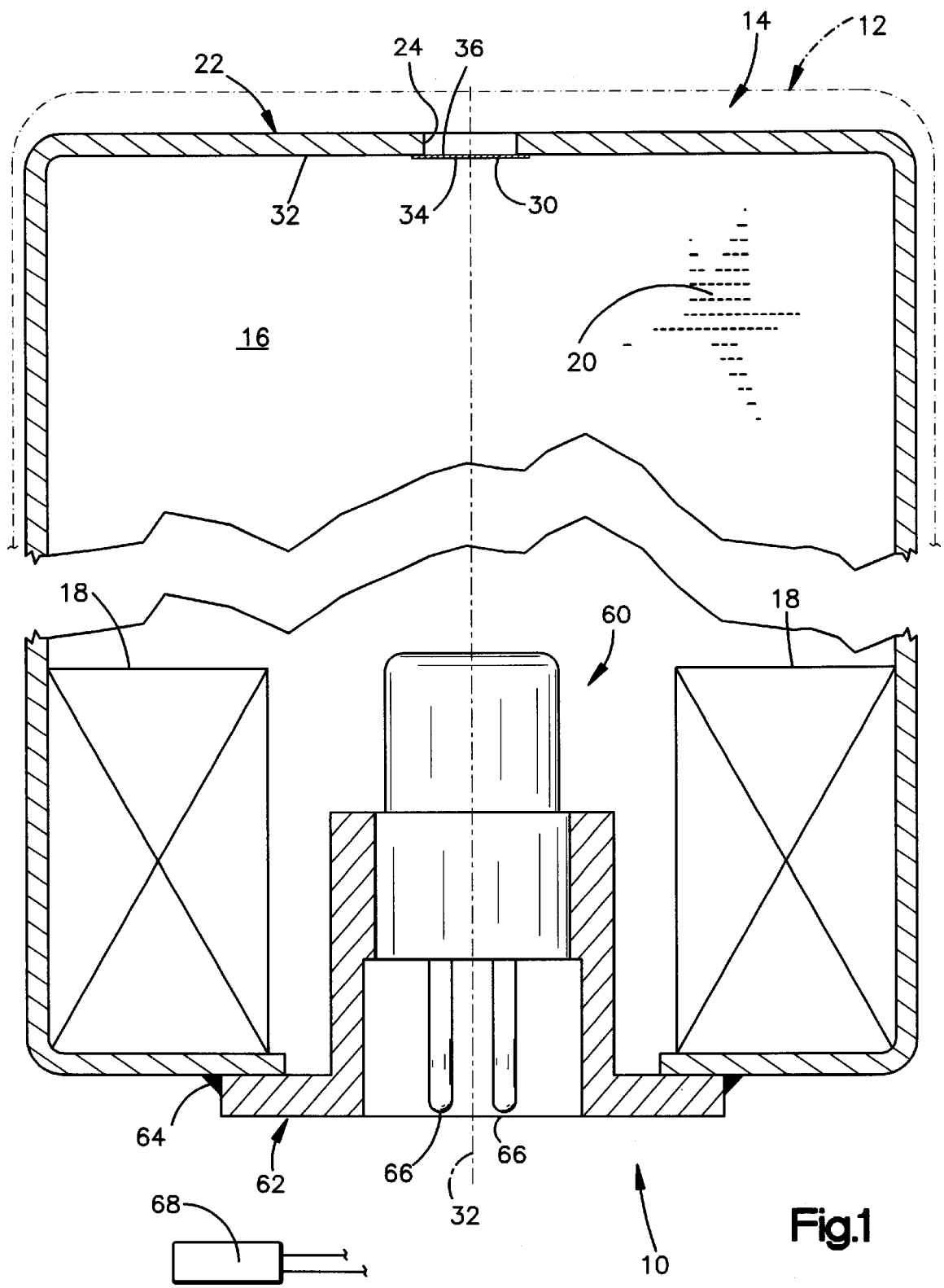
FIG. 1 is a longitudinal sectional view, partially broken away, of an inflator including a burst disk constructed in accordance with the present invention.

As representative of the present invention, FIG. 1 illustrates an inflator 10 for inflating an inflatable vehicle occupant protection device, or air bag, illustrated schematically at 12. The inflator 10 includes a container 14, which defines a chamber 16 within the container. A body of pyrotechnic material indicated schematically at 18 is disposed within the chamber 16. A quantity of gas 20, such as argon or nitrogen, is also disposed within the chamber 16 in the container 14. The gas 20 is stored under pressure in the chamber 16.

The container 14 includes an end wall 22 having an opening 24. A rupture disk, or burst disk, 30 is welded to an inner side surface 32 of the end wall 22 of the container 14. The burst disk 30 extends across the opening 24 and blocks fluid flow through the opening.

The burst disk 30 (FIGS. 2 and 3) is a thin, disk-shaped metal member having a circular configuration centered on an axis 32. The burst disk 30 has circular, inner and outer major side surfaces 34 and 36 that extend parallel to each other. An annular outer peripheral surface 38 of the burst disk 30 extends axially between the inner and outer major side surfaces 34 and 36.

A plurality of score lines are formed in the burst disk 30. The score lines may be formed by coining or in another known manner. The score lines provide predetermined weakened portions of the burst disk 30 to facilitate controlled rupturing of the burst disk, as described below. The burst disk 30 is rupturable when the pressure in the chamber 16 exceeds a predetermined pressure.

In the embodiment illustrated in FIGS. 2–4, the burst disk 30 has a pair of linear score lines 40 and 42 that intersect at the axis 32 to form a cruciform scoring pattern 44 on the outer major side surface 36 of the burst disk. The score lines 40 and 42 do not extend to the outer peripheral surface 38 of the burst disk 30. The outer major side surface 36 of the burst disk 30 is exposed to ambient pressure.

On its opposite inner major side surface 34, the burst disk 30 has a pair of linear score lines 46 and 48 that intersect at the axis 32 to form a cruciform scoring pattern 50. The score lines 46 and 48 do not extend to the outer peripheral surface 38 of the burst disk 30. The inner major side surface 34 of the burst disk 30 is exposed to the pressurized gas 20 in the chamber 16. The scoring pattern 50 on the inner major side surface 34 of the burst disk 30 is directly opposite and aligned angularly with the scoring pattern 44 on the outer major side surface 36 of the burst disk. Thus, the score lines 40 and 42 on the outer side surface 36 of the burst disk 30 overlie the score lines 46 and 48 on the inner side surface 34 of the burst disk.

An initiator 60 is located at the end of the container 14 opposite the burst disk 30. The initiator 60 includes a retainer 62, by which the initiator is welded to the container 14 as indicated at 64. The initiator 60 projects into the chamber 16 in the container 14. The initiator 60 includes terminals 66, which are electrically connected with vehicle electric circuitry indicated schematically at 68.

The vehicle electric circuitry 68 includes a power source, which is preferably a vehicle battery and/or a capacitor, and a normally open switch. The switch is part of a sensor that senses a vehicle condition indicating the occurrence of a collision. The collision-indicating condition may comprise, for example, sudden vehicle deceleration that is caused by a collision.

If a collision-indicating condition sensed by the sensor is at or above a predetermined threshold level, it indicates the occurrence of a collision having at least a predetermined threshold level of severity. The threshold level of collision severity is a level at which inflation of the air bag 12 or other vehicle occupant protection device is desired to help protect an occupant of the vehicle. The vehicle electric circuitry 68 sends an actuation current through the terminals 66 of the initiator. The initiator 60 is energized and produces combustion products including heat and hot gases.

The combustion products of the initiator 60 ignite the pyrotechnic material 18. The gas 20 stored in the container 14 is heated and augmented by the gas generated by the pyrotechnic material 18. The pressure in the chamber 16 rapidly increases to a level at which the burst disk 30 ruptures.

The burst disk 30 petals open to create an opening (not shown) through which the gas 20 from the chamber 16 can flow. The burst disk 30 does not fragment, but remains as one piece. The gas 20 flows through the opening in the burst disk 30, and through the opening 24 in the container 14, to inflate the air bag 12.

Because the burst disk 30 of the inflator 10 has identical scoring patterns 44 and 50 on both side surfaces 34 and 36, the burst disk can be assembled in the inflator 10 with either side surface exposed to the pressurized fluid 20 in the chamber 16. This makes the process of assembling the inflator 10 simpler and, therefore, less costly. In addition, having score lines on both sides of the burst disk 30 also reduces the possibility of the burst disk undesirably cupping, or bowing, as can sometimes occur when a burst disk has score lines on only one side.

A burst disk for the inflator 10 can be configured in alternative manners, to vary the way in which the burst disk ruptures and opens. As one example, FIGS. 5 and 6 illustrate a burst disk 70. In aspects other than its scoring patterns, the burst disk 70 is similar in construction to the burst disk 30 (FIGS. 1–4), and can be used in the inflator 10 as a replacement for the burst disk 30.

The burst disk 70 has a pair of linear score lines 72 and 74 that intersect at an axis 76 to form a cruciform scoring pattern 78 on a first major side surface 80 of the burst disk. On its opposite second major side surface 82, the burst disk 70 has a scoring pattern 84 that is identical to the scoring pattern 78. The scoring patterns 78 and 84 are angularly offset by forty five degrees, about the axis 76. This is in contrast to the angular alignment of the opposed scoring patterns 44 and 50 of the burst disk 30 (FIG. 2).

As another example, FIGS. 7 and 8 illustrate a burst disk 90. In aspects other than its scoring pattern, the burst disk 90 is similar in construction to the burst disk 30 (FIGS. 1–4), and can be used in the inflator 10 as a replacement for the burst disk 30.

The burst disk 90 has a cruciform scoring pattern 92 on a first major side surface 94 of the burst disk. On its opposite second major side surface 96, the burst disk 90 has a non-cruciform scoring pattern 98. The scoring pattern 98 includes three linear score lines that intersect at an axis 100. The scoring pattern 98 on the second major side surface 96 of the burst disk 90 is angularly offset, about the axis 100, from the scoring pattern 92 on the first major side surface 94 of the burst disk. In addition, the score lines of the scoring pattern 98 on the second major side surface 96 of the burst disk 90 are significantly deeper than the score lines of the scoring pattern 92 on the first major side surface 94 of the burst disk.

As still another example, FIGS. 9 and 10 illustrate a burst disk 110. In aspects other than its scoring pattern, the burst disk 110 is similar in construction to the burst disk 30 (FIGS. 1–4), and can be used in the inflator 10 as a replacement for the burst disk 30.

The burst disk 110 has a semi-circular score line 112 on a first major side surface 114 of the burst disk. On its opposite second major side surface 116, the burst disk 110 has an identical semi-circular score line 118. The ends 120 of the score line 112, and the ends 122 of the score line 118, define a hinge portion 124 of the burst disk 110. A circular portion 126 of the burst disk 110, located radially inward of the score lines 112 and 118, is bendable about the hinge portion 124 upon rupturing of the burst disk.

Figure 11:
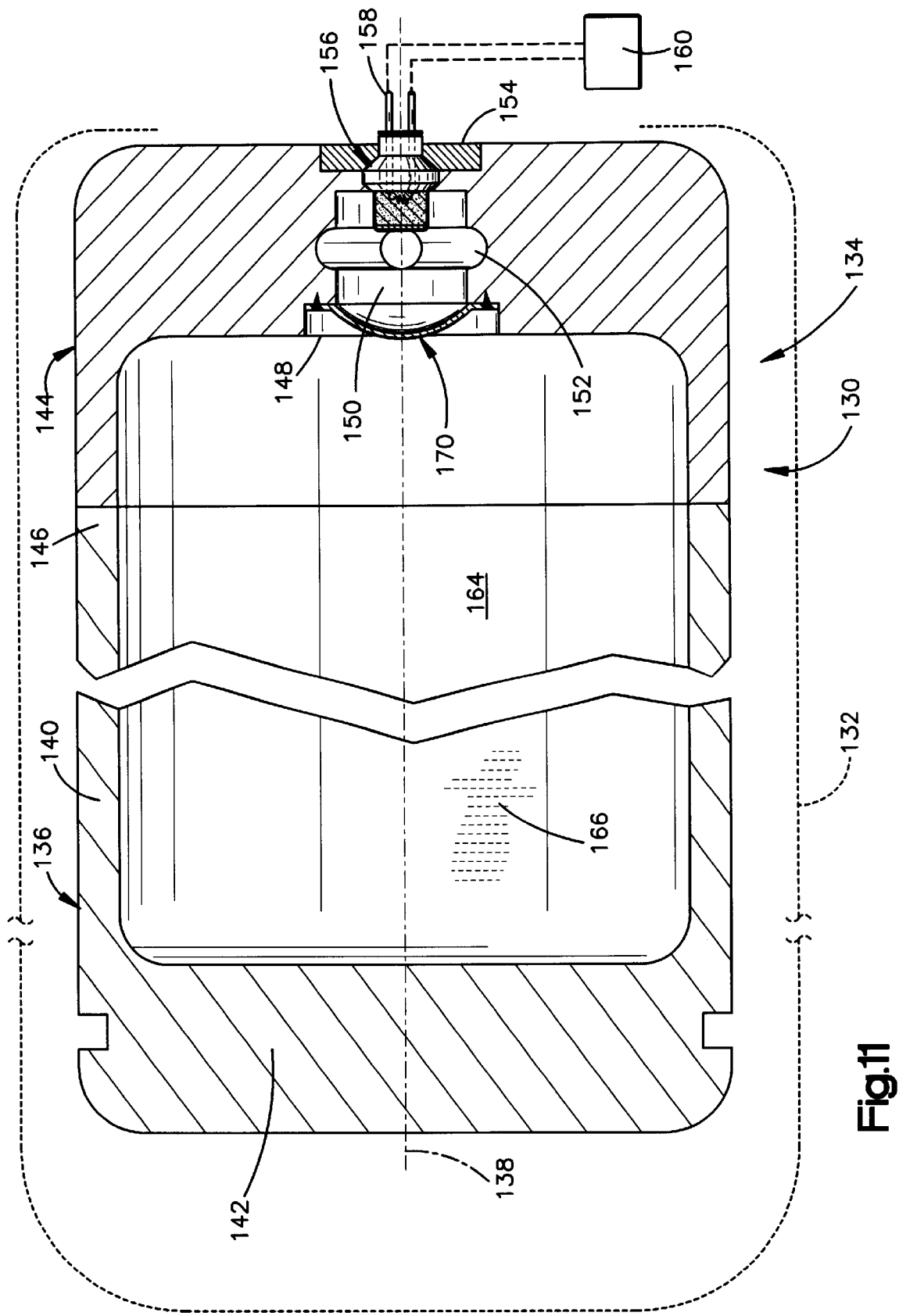
FIG. 11 is a longitudinal sectional view, partially broken away, of an inflator including a burst disk constructed in accordance a fifth embodiment of the present invention.

FIG. 11 illustrates an inflator 130 constructed in accordance with a second embodiment of the present invention. The inflator 130 is actuatable, as described below, for inflating an inflatable vehicle occupant protection device, or air bag, illustrated schematically at 132.

The inflator 130 includes a container 134. The container 134 includes a cylindrical main body portion 136, which is centered on an axis 138 of the inflator 130. The main body portion 136 of the container 134 includes a cylindrical, axially extending side wall 140 and a radially extending end wall 142. The container 134 also includes an end cap or diffuser 144 welded to an open end 146 of the main body portion 136 of the container opposite the end wall 142. The diffuser 144 defines an opening 148 into an initiator chamber 150 in the diffuser 144. A gas outlet opening 152 extends between the initiator chamber 150 and the exterior of the diffuser 144.

The inflator 130 includes a metal retainer 154 secured in the diffuser 144. The retainer 154 secures an initiator 156 in position in the inflator 130. A pair of electrical terminals 158 extend from the initiator 156 for engagement by an electrical connector (not shown) of the vehicle. The electrical terminals 158 of the initiator 156 are connected with vehicle electric circuitry indicated schematically at 160 for actuating the inflator 130.

The container 134 defines a gas storage chamber 164. A quantity of inflation fluid 166 in the form of a combustible mixture of gases is stored under pressure in the chamber 164. The combustible mixture of gases 166 includes a primary gas and a fuel gas. When burned, the fuel gas provides heat, which heats the primary gas. This mixture 166 of gases may have any suitable composition known in the art, for example, a composition in accordance with U.S. Pat. No. 5,348,344.

The container 134 has a rupturable portion that in the illustrated embodiment is a burst disk 170 welded to the diffuser 144. The burst disk 170 blocks flow of the mixture of gases 166 out of the chamber 164 through the opening 148.

Figure 12:
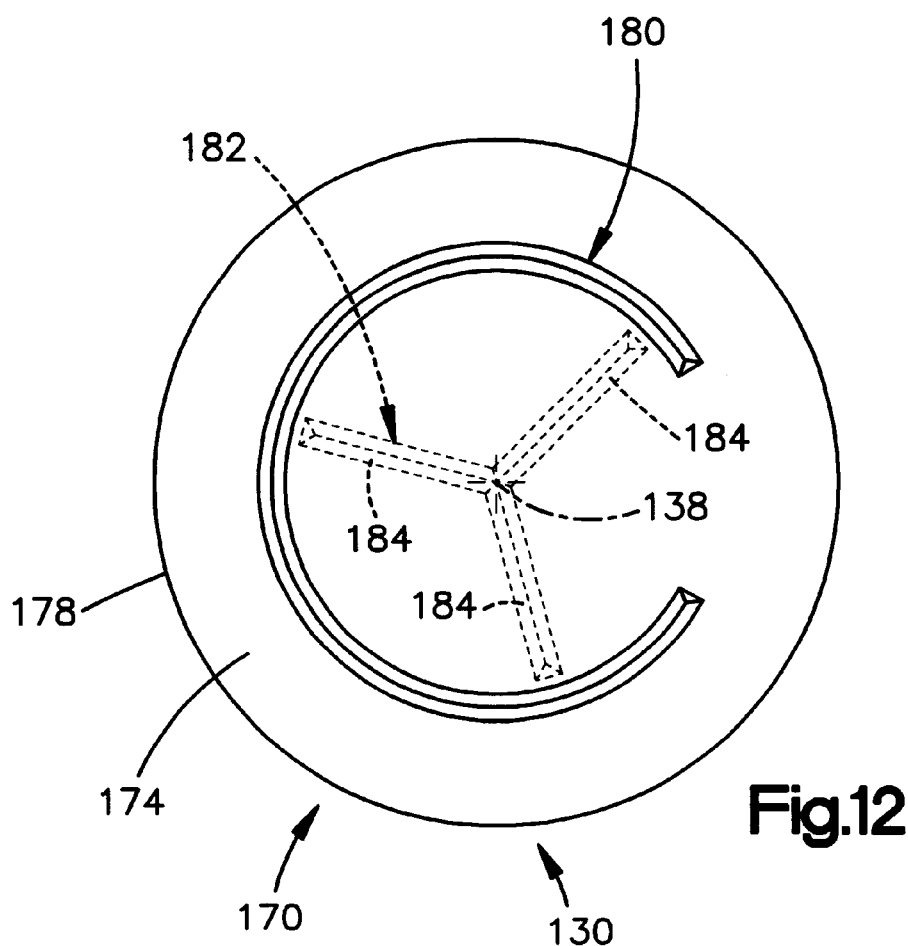
FIG. 12 is a plan view of the burst disk of the inflator of FIG. 11.
Figure 13:
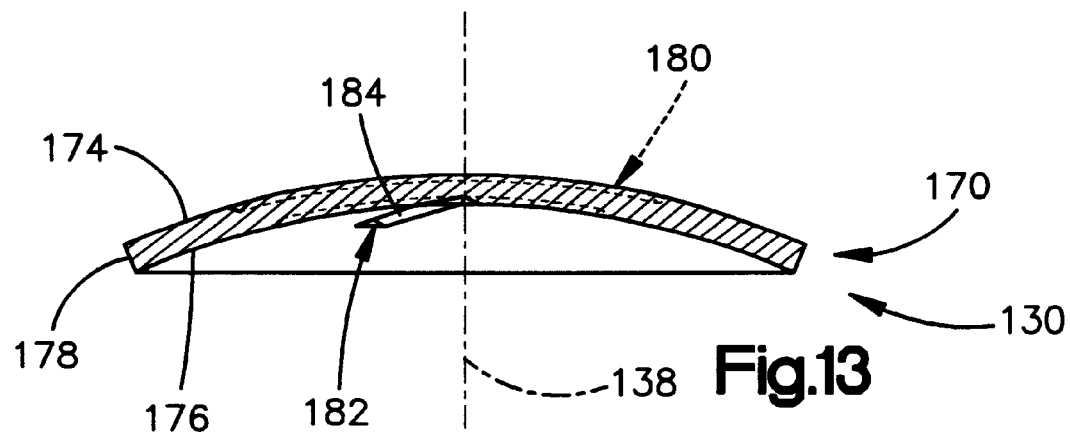
FIG. 13 is a sectional view of the burst disk of FIG. 12.

The burst disk 170 (FIGS. 12 and 13) is a thin, disk-shaped metal member having a domed, circular configuration centered on the axis 138. The burst disk 170 has parallel, inner and outer major side surfaces 174 and 176. A frustoconical outer peripheral surface 178 of the burst disk 170 extends axially between the inner and outer major side surfaces 174 and 176.

The burst disk 170 has a semi-circular score line 180 on its convex inner major side surface 174. On its concave outer major side surface 176, the burst disk 170 has a pattern 182 of three linear score lines 184 that intersect at the axis 138.

When the inflator 10 is actuated, the initiator 156 is energized electrically. Specifically, an electric current flows between the terminals 158 of the initiator 156. The initiator 156 is actuated and generates combustion products, including a small amount of hot metal particles. The hot metal particles are propelled into engagement with the burst disk 170 and rupture the burst disk. The burst disk 170 ruptures along the score lines 180 and 184, forming an opening through which inflation fluid can flow from the container 134 through the opening 148 and the gas outlet openings 152.

From the above description of the invention, those skilled in the art will perceive improvements, changes and modifications in the invention. For example, any of the burst disks illustrated in FIGS. 1–10 may be usable in the inflator 130 of FIG. 11, in place of the burst disk 170. Such improvements, changes and modifications within the skill of the art are intended to be covered by the appended claims.

Having described the invention, we claim:

1. An apparatus for inflating an inflatable vehicle occupant protection device, said apparatus comprising:

a container defining a chamber, said container having an opening through which fluid can flow from said chamber;

a quantity of inflation fluid in said chamber; and a burst disk closing said opening in said container, said burst disk having first and second opposite major side surfaces, said burst disk having a first scoring pattern including at least one score line on said first major side surface and a second scoring pattern including at least one score line on said second major side surface, said burst disk being rupturable at said first and second scoring patterns to permit inflation fluid to flow out of said chamber through said opening in said container.

2. An apparatus as set forth in claim 1 wherein said first scoring pattern on said first major side surface of said burst disk has the same configuration as said second scoring pattern on said second major side surface of said burst disk.

3. An apparatus as set forth in claim 1 wherein said the scoring pattern on said first major side surface of said burst disk is different from the scoring pattern on said second major side surface of said burst disk.

4. An apparatus as set forth in claim 1 wherein said burst disk has a scoring pattern including more than one score line on at least one of said first and second major side surfaces.

5. An apparatus as set forth in claim 1 said scoring pattern on said first major side surface of said burst disk is offset angularly from said scoring pattern on said second major side surface of said burst disk.

6. An apparatus as set forth in claim 1 wherein said first scoring pattern on said first major side surface of said burst disk includes at least one score line that is deeper than at least one score line of said second scoring pattern on said second major side surface of said burst disk.

7. An apparatus as set forth in claim 1 said burst disk has a domed, circular configuration.

* * * * *